United States Patent [19]
Ahramjian

[11] 3,920,600
[45] Nov. 18, 1975

[54] ADHESIVE COMPOSITIONS
[75] Inventor: Leo Ahramjian, Wilmington, Del.
[73] Assignee: E. I. Du Pont de Nemours & Co., Wilmington, Del.
[22] Filed: Jan. 8, 1974
[21] Appl. No.: 431,786

[52] U.S. Cl. 260/29.7 UA; 117/122 PA; 260/29.7 H; 260/29.7 W; 260/29.7 WA; 260/82.1; 260/853; 260/890
[51] Int. Cl.$^2$ ........................................ C08F 29/12
[58] Field of Search 260/29.7 W, 29.7 UA, 29.7 WA, 260/29.7 H, 82.1, 853, 890; 117/122 PA

[56] References Cited
UNITED STATES PATENTS

| | | | |
|---|---|---|---|
| 2,871,213 | 1/1959 | Graulich et al. | 260/29.3 |
| 3,308,087 | 3/1967 | Garrett | 260/82.1 X |
| 3,345,206 | 10/1967 | Korpman | 117/122 PA |
| 3,347,837 | 10/1967 | Smith | 260/82.1 |
| 3,703,568 | 11/1972 | Kadowaki et al. | 260/32.8 |

OTHER PUBLICATIONS
Blackley, High Polymer Latices I & II, pp. 121–2, 747 (Applied Science 1966).

Primary Examiner—Melvin Goldstein
Assistant Examiner—T. De Benedictis, Sr.

[57] ABSTRACT

A neoprene latex suitable for application in pressure-sensitive adhesive coatings, wherein the polymer is a copolymer of chloroprene with an $\alpha,\beta$-unsaturated carboxylic acid made in the presence of polyvinyl alcohol and a dialkyl xanthogen disulfide. An alkylated melamine-aldehyde resin, such as hexamethoxymethylmelamine, also is present in the composition, while other resins, for example, coumarone-indene resins or terpenes, can also be present. Antioxidants may be added to avoid deterioration of surfaces with which the compositions come in contact. A coating of the compositions of this invention on a surface has, after evaporation of water, pressure-sensitive adhesive properties of high and persistent tack.

14 Claims, No Drawings

ADHESIVE COMPOSITIONS

BACKGROUND OF THE INVENTION

This invention relates to compositions exceptionally well suited for use in pressure sensitive adhesive coatings.

A technical bulletin of E. I. du Pont de Nemours and Company describes an experimental latex designated ECD-2972, in which the elastomer is a copolymer of chloroprene with a carboxylated monomer. Because of the presence of carboxyl groups, this copolymer is said to have improved adhesion to metals, and the adhesive film has improved cohesive strength in the presence of metal oxides or hydroxides. Compounding of the neutralized latex with hexamethoxymethylmelamine results in a presssure-sensitive adhesive.

U.S. Pat. No. 2,871,213 (to Graulich) discloses aqueous emulsions of copolymers containing reactive groups. Among the numerous monomers containing reactive groups are recited acrylic and methacrylic acids. The monoreactive monomers, which can be copolymerized with the reactive monomers, include chloroprene. The emulsions also contain crosslinking agents such as water-soluble formaldehyde condensation products with urea, melamine, and other amides or with phenol. These compositions are said to be suitable for the production of films, foils, and coatings of many types, including adhesive coatings.

Preparation of pressure-sensitive adhesives based on neoprene usually involved in the past dissolving neoprene in organic solvents, then dissolving or dispersing in those solutions auxiliary materials such as tackifying resins. The composition was then coated on the substrate, and the solvent was evaporated. Pressure sensitive adhesive compositions based on neoprene latices did not distinguish themselves by high cohesive strength combined with long retention of tack. Yet, a latex-based formulation possesses the obvious advantages of being less costly, less polluting, and nonflammable. There is, therefore, a great need for latex-based neoprene formulations having good cohesive strength and high and persistent tack, especially for use in the pressure-sensitive adhesive field.

SUMMARY OF THE INVENTION

According to this invention, there is now provided a composition suitable in pressure-sensitive adhesive coatings which comprises:

A. An aqueous dispersion of a copolymer made by polymerizing (1) an aqueous suspension of about 90.0–99.6 mole percent of chloroprene monomer and about 0.4–10.0 mole percent of an $\alpha,\beta$-unsaturated carboxylic acid monomer in the presence of (2) about 3–10 parts of polyvinyl alcohol and 0.2–2 parts of an organic, sulfur-containing chain transfer agent selected from the group consisting of dialkyl xanthogen disulfides and alkyl mercaptans per 100 parts by weight of total monomers (1); the proportion of gel in the copolymer being about 10–95 percent; and B. An alkylated melamine-aldehyde resin in the proportion of 10–50 parts per 100 parts by weight of the copolymer A(1), the resin having a softening point of about $-20°$ to $+70°C$.

Latices in which the proportion of gel in the copolymer is about 40–60 percent are preferred. The preferred resin is a melamine/formaldehyde resin.

DETAILED DESCRIPTION OF THE INVENTION

The novel compositions of the present invention, when applied to appropriate substrates, form pressure-sensitive adhesive coatings which are particularly useful for "oneway stick" applications. The expression "one-way stick" means that the adhesive is coated on only one of the two surfaces to be bonded. Typical applications include adhesive tapes of many kinds, and decorative films or sheets such as wallpapers, overlays, and veneers.

The $\alpha,\beta$-unsaturated carboxylic acids which are used as comonomers may be represented by Formula 1, below:

(1)

wherein R is hydrogen, an alkyl radical containing 1–4 carbon atoms, or the carboxymethyl group. Examples of suitable comonomers are acrylic, methacrylic, 2-ethylacrylic, 2-propylacrylic, 2-butylacrylic, and itaconic acids. The preferred proportion of the $\alpha,\beta$-unsaturated acid in the copolymer is 1–5 mole percent, particularly 2–4 mole percent, based on the total monomers present (i.e., chloroprene plus the unsaturated acid).

A small amount, up to about 10 percent, of the chloroprene can be replaced with another copolymerizable monomer which does not contain a free carboxylic acid group. Representative comonomers that can be used in the process include vinyl aromatic compounds such as styrene, the vinyl toluenes, and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, methacrylamide, and acrylonitrile.

The polyvinyl alcohol (PVA) can be any commercially available PVA which will dissolve in the aqueous polymerization system at the temperature of the polymerization. Such PVA will usually be the products of hydrolysis of polyvinyl acetate, wherein the degree of hydrolysis is about 80–99 percent. The average degree of polymerization of the PVA will be about 350–2,500. For a general discussion of various PVA's, see Encyclopedia of Polymer Science and Technology, Interscience Publishers, Vol.14, pp. 149ff, (1971). The preferred proportion of PVA is about 4–6 parts per 100 parts of total monomers. The PVA acts as an emulsion stabilizer during the polymerization.

The chain transfer agent can be an alkyl mercaptan having a chain length of about 4–20 carbon atoms or a dialkyl xanthogen disulfide represented by the following Formula (2);

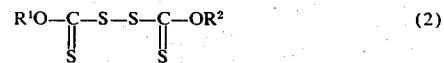
(2)

wherein each of $R^1$ and $R^2$ independently is an alkyl radical having 1–8 carbon atoms. The alkyl radicals in both the mercaptans and the xanthogen disulfides can be either straight-chain or branched. Representative mercaptans, include butyl, hexyl, octyl, dodecyl, and tridecyl mercaptans, as well as mixtures of mercaptans derived from coconut oil. Suitable xanthogen disulfides are those where $R^1$ and $R^2$ in Formula 2 are selected from methyl, ethyl, propyl, isopropyl, and the various isomeric amyl, hexyl, heptyl, and octyl radicals.

A small amount of an anionic surface active agent free of carboxylate groups may also be present. Typical surface-active agents would contain sulfate or sulfonate groups and usually are present in the form of sodium, potassium, or ammonium salts. If present, they are at a concentration of 0.01–1 weight percent based on the starting monomers.

The emulsion polymerization is usually carried out at a monomer concentration of about 40–55 percent, at a pH of about 2–4, in the presence of a free radical generator, such as an organic or inorganic peroxide, persulfate, or hydroperoxide in a redox system; for example, in the presence of potassium sulfite or sodium hydrosulfite. This polymerization technique is well known in the art, see, for example, Encyclopedia of Polymer Science and Technology, Vol. 3, pp. 705–730, Interscience Publishers (1965).

The polymerization is preferably carried to as high monomer conversion as possible; the preferred conversion is at least 85 percent, at least 90 percent being especially preferred. High conversions are desirable in order to incorporate as much as possible of the less reactive carboxylic comonomer.

The polymer is not completely soluble in solvents such as benzene, toluene, or tetrahydrofuran. The amount of the solvent-insoluble (gel) component varies depending on a number of factors. The amount of gel will increase as the temperature of polymerization increases and tends to decrease with increasing amount of chain-transfer agent. The gel content will increase as the acid latex ages. The formation of gel after polymerization can be inhibited by neutralizing the latex and providing a buffering system to minimize changes in pH of the latex during storage. The method of determining the percentage of gel component is described in the Examples.

Melamine-aldehyde resins useful in the compositions of this invention are the condensation products of melamine with an aldehyde such as formaldehyde in which the hydroxyl groups are alkylated with $C_1$–$C_4$ alkyl groups. The resins are items of commerce and are well known in the art. Encyclopedia of Polymer Science and Technology, Vol. 2, pp. 1–94, Interscience Publishers, (1965) (see especially p. 11), contains a rather extensive disclosure on the preparation and uses of these resins. For this invention it is essential the the resins be alkylated in order to prevent premature reaction of the resin with the latex and consequent coagulation. Such resins have only limited solubility in water. Liquid resins can be added either neat to the latex, or as dispersions in water, but solid resins normally would be added as dispersions. A particularly suitable resin is hexamethoxymethylmelamine, which is commercially available under the trade name "Cymel" 301 (American Cyanamid Co.).

The amount of alkylated melamine-aldehyde resin used is critical. When less than 10 parts based on the weight of the copolymer is used, the adhesive composition lacks sufficient tack to be useful for many applications. On the other hand, more than 50 parts gives an adhesive with high tack but with insufficient cohesive strength. Use of 20–40 parts is preferred as this range gives a good combination of cohesive strength and tack needed in most adhesive applications.

Before the alkylated aldehyde product is added to the latex, the latex must be neutralized, and preferably the pH is adjusted to approximately 8–9. Addition of resin to a latex below pH 7 may result in undesirable coagulation of the latex. Examples of materials that can be used to effect the pH adjustment are diethanolamine, triethanolamine (added as aqueous solution), potassium or sodium hydroxide (added as about 5 percent aqueous solution), and aqueous ammonia. Diethanolamine and triethanolamine are preferred because they contribute to the storage stability of the latex. Ammonia, on the other hand, should not be used where long latex storage is required.

The adhesive composition can contain in addition to the melamine-aldehyde condensation product other adhesive resins commonly used in neoprene adhesives and well known in the art. These include, for example, terpenes, terpenephenolics, coumarone-indenes, phenolic-modified coumarone-indenes, rosin esters, pentaerythritol esters, and polydicyclobutadiene resins. Inclusion of one or more of these resins in a total amount of about 3–10 parts per 100 parts of copolymer has the beneficial effect of extending the life of the tack of an adhesive film laid down from the latex. Particularly useful in this respect are the coumarone-indene resins and the polydicyclobutadiene resins. These adhesive resins can be added either to the emulsion of the monomers before or during polymerization or to the latex after polymerization is finished.

In order to prevent deterioration of the substrate, for example, corrosion of metal surfaces or tendering of fabric surfaces with which the adhesive comes in contact, it is desirable to have effective amount of an antioxidant present in the composition. For this purpose many antioxidants well known in the art as being useful in neoprene formulations are acceptable. An example of such an antioxidant is 4,4'-thiobis(6-tertiary-butyl-3-methylphenol).

The presence of melamine/aldehyde resin has the desirable effect of increasing bond strength with time. This rate of increase is slow at room temperature but accelerates at elevated temperatures. For example, heating a bonded structure for 15 minutes at 70°C. often doubles the strength of the adhesive bond.

The presence of PVA in the compositions of the present invention greatly increases the latex stability, as compared with latices stabilized merely by addition of surfactants. This improved stability gives the compositions a good tolerance for compounding with various additives or fillers without coagulation of the latex. Fillers thus may be included in the adhesive formulations but high levels of fillers should be avoided because of the resulting decrese of tack. The preferred amount of filler is that required for pigmentation. Naturally, the most preferred compositions will contain no fillers. Those that can be used include silica, carbon black, calcium carbonate, and many other known fillers, for example, in powder, granule, or fiber form.

The compositions of this invention are applied to appropriate substrates in any convenient manner, for example, by painting or spraying on one side of the substrate or by passing a film or tape over a roller which dips on one side in the adhesive composition. Water is then evaporated or allowed to evaporate from the surface, leaving a pressure-sensitive adhesive coating thereon.

Evaporation of the water may be done at either ambient or elevated temperatures. The adhesive composition should not be maintained at elevated temperatures longer than required to complete evaporation of the water because the heat treatment can cause loss of tack.

The invention is now illustrated by the following representative examples in which all parts and percentages are by weight unless otherwise indicated.

EXAMPLE 1

Preparation of Latex

The following general procedure is used. A solution is made of chloroprene, methacrylic acid, and the chain-transfer agent. An aqueous solution is prepared of the water and the PVA. These two solutions are emulsified to form an oil-in-water emulsion.

The PVA used has a degree of polymerization of 500-600 and mole percent of hydrolysis of 87–89 percent.

Procedure for Determining Gel in the Polymer

A film of latex is cast on a surface coated with polytetrafluoroethylene and allowed to dry for at least 24 hours. Two discs 1 in. in diameter are died out of each film and weighed. The thickness of the film is such that the discs weigh 0.1–0.3 gram. This weight is the original weight [O]. The discs are swollen in tetrahydrofuran in a closed jar for at least 24 hours. The swollen polymer is removed from the solvent, and excess solvent is removed by blotting. The swollen polymer is redried and weighed to give the swollen weight [G]. The percent gel is calculated as follows:

$$\% \text{ gel} = \frac{[G]}{[O]} \times 100$$

Latex used in Examples 2 through 5, below, to make pressure sensitive adhesives is prepared using the following recipe:

|  | Parts |
| --- | --- |
| Chloroprene | 97 |
| Methacrylic acid | 3 |
| Diisopropyl xanthogen disulfide | 0.8 |
| Water | 110 |
| PVA | 5 |

The redox catalyst system is sodium sulfite and potassium persulfate, which are added as required to initiate and maintain polymerization.

The polymerization is carried out to full monomer conversion (about 98 percent). Temperature of polymerization is 45°C.

At the end of the polymerization, an emulsion containing about 0.01 part each of phenothiazine and 4-tertbutylpyrocatechol is added to stabilize against any further polymerization.

The percent of gel in the polymers, determined after the unneutralized latex has aged for one day, is 60 percent.

PREPARATION OF ADHESIVES

EXAMPLE 2

To 100 grams of the latex prepared in Example 1 is added an aqueous solution of triethanolamine until the pH of the dispersion increases to 8. After the pH adjustment, 2.5 grams of a 40 percent aqueous dispersion of 6-tertiary-butyl-3-methylphenol antioxidant, 10 grams of hexamethoxymethylmelamine ("Cymel" 301, American Cyanamid), and 5 grams of a 55 percent aqueous dispersion of an α-methylstyrene/vinyl toluene resin ("Picco" 484, Pennsylvania Industrial Chemical Corp.) are added with stirring. The latex compound so obtained is doctored onto a 1 mil-thick polyester film (Mylar) to give a 1 mil-thick coating of adhesive after drying at room temperature. The pressure-sensitive adhesive tape thus obtained has the following adhesive properties:

| | |
| --- | --- |
| Quick-Stick[1], pounds per linear inch | 1.5 |
| Rolling Ball Tack Test[2], inches | 1.8 |
| Holding Power[3] against 1 kg/sq. in. force, hours | |
| At ambient temperature | >268 |
| At 70°C. | >16 |

[1] - Pressure Sensitive Tape Council Test No. 5
[2] - Pressure Sensitive Tape Council Test No. 6
[3] - Pressure Sensitive Tape Council Test No. 7

EXAMPLE 3

The latex adhesive prepared in Example 2 is brushed onto the fabric backing of a vinyl coated fabric. The fabric is then adhered to a primed steel surface on which it exhibits an initial peel value (Pressure Sensitive Tape Council Test No. 1) of 9 pounds per linear inch. On heating the assembly for 3 days at 70°C., the peel value increases to 14 pounds per linear inch.

EXAMPLE 4

The procedure of Example 2 is repeated except that the antioxidant and the α-methylstyrene/vinyltoluene resin are omitted and 13 grams of hexamethoxymethylmelamine is added to 100 grams of the latex. Excellent adhesive properties similar to those of Example 1 are obtained immediately after the adhesive tape is prepared, but after 1 month at ambient temperature the tack is appreciably diminished. When an auxiliary adhesive resin is included as in Example 1, the excellent initial tack is retained for 6 months or more at ambient temperature.

Example 4 illustrates the improved tack obtained when an adhesive resin is included in the latex compound in addition to hexamethoxymethylmelamine.

EXAMPLE 5

The procedure of Example 2 is repeated except that 15 grams of hexamethoxymethylmelamine is used, and 5.0 grams of a 50 percent aqueous dispersion of polydicyclobutadiene resin ("Picco" 2215, Pennsylvania Industrial Chemical Corp.) replaces the α-methylstyrene/vinyltoluene resin. Adhesive properties of the pressure sensitive adhesive tape made on polyester film are as follows:

| | |
| --- | --- |
| Rolling Ball Tack Test, inches | |
| Original | 0.9 |
| 4 Months After Preparation of Tape | 1.1 |

I claim:

1. A composition suitable in the formation of pressure-sensitive adhesive coatings, said composition comprising:
   A. an aqueous dispersion of a copolymer made by polymerizing in the absence of surface active agents containing carboxylate groups (1) an aqueous suspension of about 90.0–99.6 mole percent of chloroprene monomer and about 0.4–10.0 mole percent of an α,β-unsaturated carboxylic acid monomer in the presence of (2) about 3–10 parts of polyvinyl alcohol and 0.2–2 parts of an organic, sulfur-containing chain transfer agent selected from the group consisting of dialkyl xanthogen disulfides and alkyl mercaptans per 100 parts of polyvinyl alcohol and 0.2–2 parts of an organic, sulfur-containing chain transfer agent selected from the group consisting of dialkyl xanthogen disulfides and alkyl mercaptans per 100 parts by weight of total monomers (1); the proportion of gel in the copolymer being about 10–95 percent; and
   B. an alkylated melamine-aldehyde resin in the proportion of 10–15 parts per 100 parts by weight of the copolymer A(1), the resin having a softening point of about −20° to +70°C.; with the provisos that
      a. the α,β-unsaturated carboxylic acid comonomer of part A, above, is represented by the following formula:

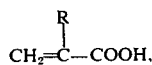

wherein R is hydrogen, an alkyl radical containing 1-4 carbon atoms, or the carboxymethyl group;
      b. alkyl mercaptan chain transfer agents of part A, above, have 4–20 carbon atoms;
      c. dialkyl xanthogen disulfide chain transfer agents of part A, above, are represented by the following formula:

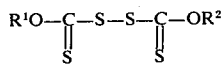

wherein each of $R^1$ and $R^2$ independently is an alkyl radical having 1–8 carbon atoms; and
      d. up to about 10 percent of the chloroprene can be replaced with another copolymerization monomer which does not contain a free carboxylic group.

2. A composition of claim 1 also containing at least one other adhesive resin selected from the class consisting of terpenes, terpene-phenolics, coumarone-indenes, phenolic-modified coumarone-indenes, rosin esters, pentaerythritol esters, and polydicyclobutadiene resins, in a total amount of about 3–10 parts per 100 parts of copolymer.

3. A composition of claim 1 also containing an amount of antioxidant effective to prevent deterioration of substrate surfaces with which the composition comes in contact.

4. A composition of claim 1 containing an amount of filler sufficient to confer desired pigmentation.

5. A composition of claim 1 wherein the alkylated melamine-aldehyde resin is hexamethoxymethylmelamine.

6. A composition of claim 1 wherein the proportion of gel in the copolymer is about 40–60 percent by weight.

7. A composition of claim 1 wherein the α,β-unsaturated acid comonomer incorporated into the copolymer is selected from acrylic, methacrylic, and itaconic acids.

8. A composition of claim 1 wherein the polyvinyl alcohol has an average degree of polymerization of about 350–2500, is a product of 80–99 percent hydrolysis of polyvinyl acetate, and is present at a concentration of about 4–6 parts per 100 parts by weight of total monomers.

9. A composition of claim 1 wherein the proportion of component B is 20–40 parts per 100 parts of copolymer A(1).

10. An article having on at least one of its surfaces a pressure-sensitive adhesive coating obtained by depositing on said surface a sufficient amount of a composition of claim 1 to confer pressure-sensitive adhesive properties upon that surface on removal of water, then allowing water to evaporate at ambient or elevated temperature.

11. An article having on at least one of its surfaces a pressure-sensitive adhesive coating obtained by depositing on said surface a sufficient amount of a composition of claim 2 to confer pressure-sensitive adhesive properties upon that surface on removal of water, then allowing water to evaporate at ambient or elevated temperature.

12. An article having on at least one of its surfaces a pressure-sensitive adhesive coating obtained by depositing on said surface a sufficient amount of a composition of claim 3 to confer pressure-sensitive adhesive properties upon that surface on removal of water, then allowing water to evaporate at ambient or elevated temperature.

13. An article having on at least one of its surfaces a pressure-sensitive adhesive coating obtained by depositing on said surface a sufficient amount of a composition of claim 4 to confer pressure-sensitive adhesive properties upon that surface on removal of water, then allowing water to evaporate at ambient or elevated temperature.

14. An article having on at least one of its surfaces a pressure-sensitive adhesive coating obtained by depositing on said surface a sufficient amount of a composition of claim 5 to confer pressure-sensitive adhesive properties upon that surface on removal of water, then allowing water to evaporate at ambient or elevated temperature.

* * * * *